(12) United States Patent
Ono et al.

(10) Patent No.: US 7,785,688 B2
(45) Date of Patent: Aug. 31, 2010

(54) OPTICAL DISC AND MATERIAL FOR SUBSTRATE THEREOF

(75) Inventors: Minoru Ono, Gifu (JP); Tadahiro Miyazaki, Aichi (JP); Masahiro Higuchi, Gifu (JP); Yoshiaki Maeno, Gifu (JP); Takashi Arai, Chiba (JP); Masahiro Sugi, Chiba (JP)

(73) Assignees: Sanyo Electric Co., Ltd., Osaka (JP); Mitsui Chemicals, Inc., Tokyo (JP)

( * ) Notice: Subject to any disclaimer, the term of this patent is extended or adjusted under 35 U.S.C. 154(b) by 1155 days.

(21) Appl. No.: 11/287,249

(22) Filed: Nov. 28, 2005

(65) Prior Publication Data

US 2006/0115619 A1 Jun. 1, 2006

(30) Foreign Application Priority Data

Nov. 26, 2004 (JP) ............................. 2004-342082

(51) Int. Cl.
*B32B 3/02* (2006.01)
(52) U.S. Cl. ................. 428/64.1; 428/64.4; 430/270.11
(58) Field of Classification Search ................ 428/64.4; 430/270.11
See application file for complete search history.

(56) References Cited

U.S. PATENT DOCUMENTS

| | | | | |
|---|---|---|---|---|
| 5,691,398 A * | 11/1997 | Tanifuji et al. | ............... | 523/124 |
| 6,649,240 B2 * | 11/2003 | Ohishi | ..................... | 428/64.1 |
| 7,160,948 B2 * | 1/2007 | Matsuo et al. | ............ | 525/92 R |
| 2004/0054051 A1 * | 3/2004 | Ouchi et al. | ................. | 524/314 |
| 2004/0225269 A1 * | 11/2004 | Zhao et al. | ................... | 604/364 |
| 2004/0242803 A1 * | 12/2004 | Ohme et al. | ................. | 525/400 |
| 2005/0286398 A1 * | 12/2005 | Higuchi et al. | ........... | 369/272.1 |

FOREIGN PATENT DOCUMENTS

| | | | |
|---|---|---|---|
| JP | 08-301993 | A | 11/1996 |
| JP | 09-077863 | A | 3/1997 |
| JP | 09 151310 | | 6/1997 |
| JP | 09-300522 | A | 11/1997 |
| JP | 10 036651 | | 10/1998 |
| JP | 2000-011448 | A | 1/2000 |
| JP | 2001-344813 | A | 12/2001 |
| JP | 2003-064246 | * | 3/2003 |
| JP | 2004-269720 | | 9/2004 |
| JP | 2004 330478 | | 11/2004 |
| JP | 2005171204 | A * | 6/2005 |
| JP | 2005190602 | * | 7/2005 |
| WO | 2004/068483 | A1 | 8/2004 |

OTHER PUBLICATIONS

XP002522499, "Optical Element such as light modulator, contains copolymer of lactic acid and poly functional compound other than lactic acid",Thomson Science, London, GB 2002-058338, 2 pages.
European Search Report dated Jun. 24, 2009, 10 pages.
Japanese Office Action dated Jul. 14, 2009, 3 pages.

* cited by examiner

*Primary Examiner*—Elizabeth Mulvaney
(74) *Attorney, Agent, or Firm*—Arent Fox LLP

(57) ABSTRACT

An optical disc 10 includes a substrate. The substrate is formed by mixing polymethyl methacrylate and a polylactic acid-based resin composition. The polylactic acid-based resin composition contains polylactic acid-based resin in which the content of lactide is reduced to 1,000 ppm or less, and a mold release agent of 0.16 to 0.32 phr. The weight ratio of the polylactic acid-based resin to the polymethyl methacrylate is 70:30 to 50:50.

16 Claims, 4 Drawing Sheets

WEIGHT OF POLYLACTIC ACID-BASED RESIN: WEIGHT OF POLYMETHYL METHACRYLATE

OPTICAL DISC AND MATERIAL FOR SUBSTRATE THEREOF

BACKGROUND OF THE INVENTION

1. Field of the Invention

The present invention relates to an optical disc and a material for a substrate thereof. More specifically, the present invention relates to an optical disc with fewer loads to the environment such as CD, DVD, blue-ray disc and advanced optical storage (AOD), and a material for a substrate thereof.

2. Description of the Prior Art

One example of this kind of conventional optical disc is disclosed in Japanese Patent Laying-open No. 2000-11448 [G11B 7/24].

In the degradable optical recording medium in Japanese Patent Laying-open No. 2000-11448, the substrate and the protective layer are formed of biodegradable resin, and the reflective film uses aluminum.

An optical disc with a substrate using biodegradable resin is proposed in the prior art of Japanese Patent Laying-open No. 2000-11448. However, such an optical disc has been not yet become commercially practicable. This is because the substrate of an optical disc is required to have high levels of transparency, transferability and mass-producibility but biodegradable resin does not meet all these requirements.

More specifically, biodegradable resin, polylactic acid-based resin in particular, is of high flowability and adhesiveness to an injection molding die, and thus it is necessary to add a mold release agent for removing the resin from the die. Adding a too large amount of mold release agent would decrease the transparency of the resin, and in reverse, the addition of a too small amount of mold release agent would make it hard to remove the substrate from the die. Thus, it is difficult to achieve high levels of transferability and mass-producibility.

Besides, in order the substrate of polylactic acid-based resin to satisfy the requirements for the substrate of an optical disc, high levels of transparency and transferability, it is necessary to use a kind of polylactic acid-based that is suitable for the substrate of an optical disc.

SUMMARY OF THE INVENTION

Therefore, it is a primary objective of the present invention to provide a novel optical disc and material for a substrate thereof.

It is another objective of the present invention to provide an optical disc and a material for a substrate thereof, which use a plant-derived resin such as polylactic acid-based resin and possess high levels of transparency, transferability and mass-producibility.

The present invention is an optical disc comprising a substrate with a signal recording surface formed on one side and made of polylactic acid-based resin composition having polylactic acid-based resin with a mold release agent added, wherein the content of lactide in the polylactic acid-based resin is 1,000 ppm or less and the amount of the added mold release agent is 0.16 to 0.32 phr.

In the present invention, the mold release agent is added to the polylactic acid-based resin to form the polylactic acid-based resin composition, and the polylactic acid-based resin composition is injection-molded by means of a substrate die. The molded substrate is easy to remove from the die, and thus it is possible to mold the substrate at a high speed and with high transferability of substrate pits.

Additionally, by keeping the content of lactide in the polylactic acid-based resin below 1,000 ppm, it is possible to prevent the substrate from being clouded and enhance the transparency of the substrate.

Moreover, by setting the amount of the added mold release agent to 0.16 to 0.32 phr, it is possible to avoid deterioration in the transparency of the substrate and secure the mass-producibility of the substrate while maintaining its transferability.

Furthermore, it is possible to enhance the heat resistance of the substrate by mixing alkyl (meth)acrylate-based resin with a high temperature of glass transition into the polylactic acid-based resin composition.

In addition, by setting the weight ratio of the polylactic acid-based resin to the alkyl (meth)acrylate-based resin at 70:30 to 50:50, it is possible to enhance the heat resistance of the substrate while maintaining the superiority of the plant-derived resin in the substrate.

An optical disc according to one aspect of the present invention comprises a substrate with a signal recording surface formed on one side and made of transparent resin having an alloy of polylactic acid-based resin and alkyl (meth)acrylate-based resin, wherein the weight ratio of the polylactic acid-based resin to the alkyl (meth)acrylate-based resin is 70:30 to 50:50.

In this aspect, by setting appropriately the weight ratio of the polylactic acid-based resin to the alkyl (meth)acrylate-based resin, it is possible to enhance the heat resistance while maintaining the superiority of the plant-derived resin in the substrate.

In one embodiment of the present invention, the optical disc further comprises a reflective film formed on the signal recording surface of the substrate by either a plant-derived material or a material existing in nature, an base printing layer formed so as to cover the reflective film by either a plant-derived material or a material existing in nature, and a label print layer formed on the base printing layer by either a plant-derived material or a material existing in nature.

In this embodiment, the optical disc comprises the substrate, the reflective film, the base printing layer and the label print layer. By forming these components by plant-derived materials, etc., the optical disc's adaptability to the environment can be enhanced.

An optical disc in another aspect of the present invention comprises two substrates with a signal recording surface formed on one side and made of transparent plant-derived resin, the two substrates having their signal recording surfaces opposed to each other, at least one of the two substrates being formed by transparent resin in which polylactic acid-based resin and alkyl (meth)acrylate-based resin are alloyed, and further comprises reflective films formed on the signal recording surfaces of the two substrates by either a plant-derived material or a material existing in nature.

In this aspect, for example, the optical disc is formed by laminating the substrate, the reflective film, an adhesive layer, the reflective film and the substrate in this order.

By using a transparent resin with an alloy of polylactic acid-based resin and the alkyl (meth)acrylate-based resin to form the substrates and using a plant-derived material, etc. to make the reflective films, it is possible to enhance the superiority and heat resistance of the plant-derived resin in the optical disc.

By providing the recording film between the substrate and the reflective film, it becomes possible to rewrite a signal into the optical disc.

In another embodiment of the present invention, an optical disc further comprises a first substrate with a signal recording surface formed on one side and made of transparent plant-derived resin, a semipermeable reflective film formed on the signal recording surface of the first substrate by either a plant-derived material or a material existing in nature, an adhesive layer formed by transparent resin on the semipermeable reflective film, a second substrate with a signal recording surface formed on one side and made of plant-derived resin on the adhesive layer, and a reflective film formed on the signal recording surface of the second substrate by either a plant-derived material or a material existing in nature, and at least one of the first substrate and the second substrate is formed by transparent resin in which polylactic acid-based resin and alkyl (meth)aclylic resin are alloyed.

The optical disc includes a lamination of the first substrate, the semipermeable reflective film, the adhesive layer, the reflective film and the second substrate in this order. By using the transparent resin with an alloy of polylactic acid-based resin and alkyl (meth)acrylate-based resin to make at least one of the first substrate and the second substrate and using a plant-derived material to make the reflective film, the optical disc's environmental adaptability and heat resistance are improved.

By using the polylactic acid-based resin to make the first substrate in contact with the outside world, the optical disc's adaptability to the environment is increased. Also, by using the transparent resin with an alloy of polylactic acid-based resin and alkyl (meth)acrylate-based resin to make the second substrate, it becomes easy to maintain the shape of the optical disc.

In still another aspect, the present invention is a material for a substrate of an optical disc with a signal recording surface formed on one side, the material being made of a polylactic acid-based resin composition in which a mold release agent is added to polylactic acid-based resin, wherein the content of lactide in the polylactic acid-based resin is set at 1,000 ppm or less and the amount of the added mold release agent is set at 0.16 to 0.32 phr.

Alkyl (meth)acrylate-based resin may be further mixed into the polylactic acid-based resin composition.

Preferably, the weight ration of the polylactic acid-based resin to the alkyl (meta) acryl-based resin is set at 70:30 to 50:50.

According to the present invention, it is possible to secure the superiority, transparency, and high levels of transferability and mass-producibility of the optical disc by using polylactic acid-based resin to make the substrate, adding an appropriate amount of mold release agent to the polylactic acid-based resin, and keeping down the content of lactide in the polylactic acid-based resin.

The above described objects and other objects, features, aspects and superiority of the present invention will become more apparent from the following detailed description of the present invention when taken in conjunction with the accompanying drawings.

DETAILED DESCRIPTION OF THE PREFERRED EMBODIMENTS

Figure 1:
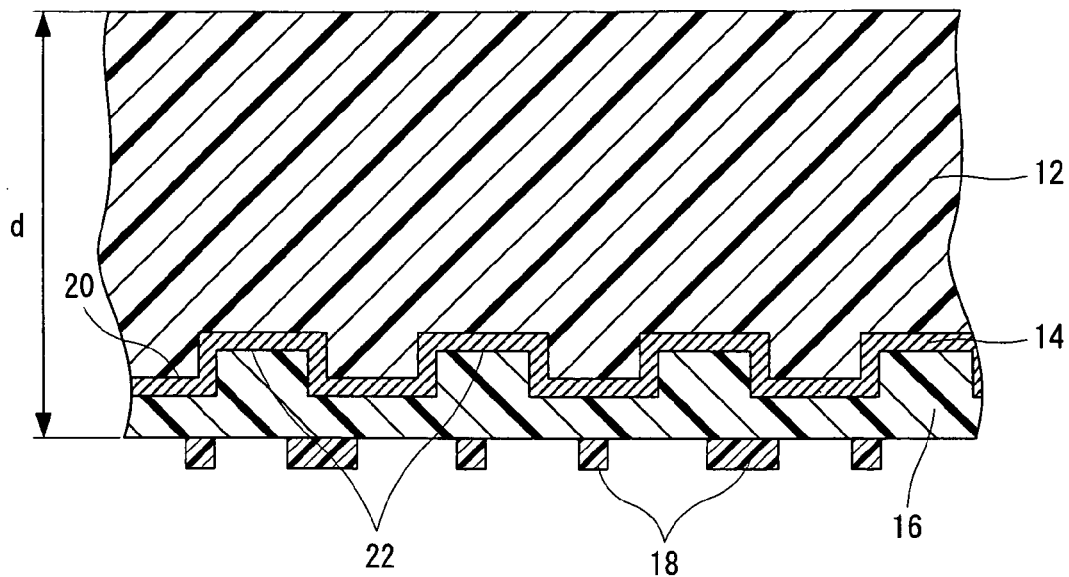
FIG. 1 is a cross section view of an optical disc of one embodiment of the present invention.

An optical disc 10 as one embodiment of the present invention shown in FIG. 1 is a disc in which a reflective film 14, an base printing layer 16, and a label print layer 18 are laminated in this order on a substrate 12.

The substrate 12 is a circular plate in which pits 22, etc. are provided on one side as a signal recording surface 20, and is made of transparent resin of an alloy of a polylactic acid-based resin composition and alkyl (meth)acrylate-based resin. The polylactic acid-based resin composition is obtained by adding a mold release agent to plant-derived polylactic acid-based resin. The weight ratio of the polylactic acid-based resin to the alkyl (meth)acrylate-based resin is 70:30 to 50:50, preferably 55:45. The amount of the added mold release agent is 0.16 to 0.32 phr, preferably 0.2 to 0.3 phr. The unit phr used in relation to the present invention is an abbreviation of parts per hundred parts of resin, and denotes, assuming that the resin is 100 weight parts, the number of weight parts of added compounding agents with respect to the weight parts of the resin.

Plant-derived resin is resin obtained by using renewable grain resources, etc., not using fossil materials. Such resin is made by obtaining a monomer through the fermentation of sugars, starch, etc. contained in the grain resources and polymerizing the monomer. For example, polylactic acid-based is made by obtaining lactic acid through the fermentation of sugars, starch, etc. in the grain resources including corns and sweet potatoes and polymerizing the lactic acid. Likewise, succinic acid and diols are obtained by fermenting sugars, starch etc., and soft plant-derived resin is made by polymerizing these ingredients. By using such plant-derived resin, it is possible to help restrain such problem as the exhaustion of fossil materials and oil resources and the increase of carbon dioxide emission.

Polylactic acid-based resin is polyester with lactic acids as main ingredients, and contains preferably 50 (weight %) or more of lactic acids, and more preferably 75 (weight %) or more of them. The ingredients of the polylactic acid-based resin other than the lactic acids include aliphatic hydroxycarboxylic acids, aliphatic carboxylic acids and aliphatic diols with carbon numbers of 2 to 10, aromatic compounds such as terephthalic acid, homopolymers and copolymers having these acids and compounds as major ingredients, and mixtures of these acids, compounds and polymers. The weight-average molecular weight of the polylactic acid-based resin is preferably 80 to 500 thousands, and more preferably 100 to 250 thousands.

The lactic acids include L-lactic acid, D-lactic acid, mixtures of these acids and lactide as a cyclic dimer. The lactic acids can be used in conjunction with hydroxycarboxylic acids. The hydroxycarboxylic acids are hydroxycarboxylic acids with carbon number of 2 to 10 other than the lactic acids, and preferably includes glycolic acid, 3-hydroxybutyric acid, 4-hydroxybutyric acid, 4-hydroxyvaleric acid, 5-hydroxyvaleric acid, 6-hydroxycaproic acid, cyclic ester intermediates of hydroxycarboxylic acid, etc. The cyclic ester intermediates of hydroxycarboxylic acid include glycolide as a dimer of glycolic acid, and ε-caprolactam as a cyclic ester of 6-hydroxycaproic acid.

The aliphatic carboxylic acids are preferably aliphatic carboxylic acids with carbon numbers of 2 to 30. More specifically, they include oxalic acid, succinic acid, glutaric acid, adipic acid, pimelic acid, suberic acid, azelaic acid, sebacic acid, undecanedioic acid, dodecanedioic acid, phenylsuccinic acid, 1,4-phenylenediamine acetic acid, etc. These ingredients can be used independently or in combination.

The aliphatic diols are preferably aliphatic diols with carbon numbers of 2 to 30. More specifically, they include ethylene glycol, diethylene glycol, triethylene glycol, polyethylene glycol, propylene glycol, dipropylene glycol, 1,3-butanediol, 1,4-butanediol, 3-methyl-1,5-pentane diol, 1,6-hexanediol, 1,9-nonanediol, neopentyl glycol, polytetramethylene glycol, 1,4-cyclohexanedimethanol, 1,4-benzenedimethanol, etc. These ingredients can be used independently or in combination.

Alternatively, it is possible to make small amounts of aliphatic polyalcohols, such as trimethylolpropane and glycerin, coexist with aliphatic hydroxycarboxylic acids, aliphatic carboxylic acids, or aliphatic diols, and copolymerize these ingredients. In addition, it is possible to increase the molecular weight of the polylactic acid-based resin by mixing a binding agent including a high-molecular weight chain extender such as a diisocyanate compound, into the polylactic acid-based resin.

The polylactic acid-based resin has the above mentioned ingredients as materials, and is obtained through the direct dehydration polymerization of these ingredients. In this case, preferably, the polylactic acid-based resin is obtained from only the lactic acids as materials or through the azeotropic dehydration condensation of a mixture of lactic acids, hydroxycarboxylic acids, and aliphatic hydroxycarboxylic acid, aliphatic diols, etc., under the presence of an organic solvent such as a phenyl ether-based one. More preferably, the polylactic acid-based resin is obtained by returning the solvent in the state of being virtually dehydrated through azeotropic distillation, to the reactive state, and polymerizing only the lactic acids or a mixture of lactic acids, hydroxycarboxylic acids, and aliphatic hydroxycarboxylic acid, aliphatic diols, etc. In this case, the polylactic acid-based resin having only the lactic acids as material is preferable to the polylactic acid-based resin with a mixture of lactic acids, hydroxycarboxylic acids, etc. as material. Preferably in particular, the polylactic acid-based resin has only pure lactic acids as material, out of lactic acids and lactic acid-based substances.

In addition, the polylactic acid-based resin is also obtained through ring-opening polymerization of cyclic dimers of lactic acids and hydroxycarboxylic acids. The dimers are cyclic ester intermediates such as lactide, glycolide, and ε-caprolactam, for example. In the case of obtaining polylactic acid-based resin through ring-opening polymerization of lactide, the polylactic acid-based resin contains lactide of 1% or more. On this account, the content of lactide in the polylactic acid-based resin is kept below 1,000 ppm, preferably below 800 ppm, and more preferably below 600 ppm, by removing lactide from the polylactic acid-based resin through pressure-reduced melt blending, removal of low-volatile ingredients after polymerization, solvent washing of a pellet, blowing of heated nitrogen on the pellete, etc. More specifically, in the case of using the pressure-reduced melt blending method, the lactide is removed from the polylactic acid-based resin by heating and melting the polylactic acid-based resin with a biaxial kneading machine to vaporize the lactide lower in melting point than the polylactic acid-based resin and then sucking the lactide through a vent hole under a reduced pressure.

Usable as the mold release agent to be mixed into the polylactic acid-based resin are publicly known mold release agents in general, such as silicon-based, amide-based, alcohol-based and carboxylic-based ones. More specifically, they include ethylenebis stearamide, ethylenebis lauramide, erucic amide, stearic amide, oleic amide, stearic acid, oleic acid, palmitic acid, lauric acid, lauryl alcohol, myristyl alcohol, stearyl alcohol, palmityl alcohol, calcium stearate, magnesium stearate, barium stearate, ethyl stearate, methyl oleate, montanic acid ester, aliphatic glyceride, propylene glycol aliphatic ester, glycerine fatty acid ester and montanic acid wax. Preferable are ethylenebis stearamide, stearic acid and stearyl alcohol. More preferable are ethylenebis stearamide and stearic acid.

Besides the mold release agent, it is possible to add stabilization agents (oxidation inhibitor, ultraviolet absorbent, light stabilizer, etc.), lubricant, antistatic agents, coloring agents (dyes, pigments, etc.), nucleating agents (organic metallic salt of carboxylic acid, bisamides, etc.), plastilizing agents or end-capping agents (epoxy compounds, oxazoline compounds, carbodiimide compounds, etc.) and other kinds of resin, to the resin in which the alkyl (meth)acrylate-based resin is alloyed with the polylactic acid-based resin and the polylactic acid-based resin, according to the usage of this resin and within the bounds of not missing the objectives of the present invention. These additives can be used singly or in combination.

Preferably, the alkyl (meth)acrylate-based resin has at least one kind of monomer selected between acrylate and methacrylate, as a constitutional unit. The monomer may be alkyl acrylate such as methyl acrylate, ethyl acrylate, n-proplyl acrylate and n-butyl acrylate, or may be alkyl methacrylate such as methyl methacrylate and ethyl methacrylate. More preferably, the monomer is methyl methacrylate.

In using polymethyl methacrylate for the alkyl (meth)acrylate-based resin, the alkyl (meth)acrylate-based resin may contain not only polymethyl methacrylate as a homopolymer of methyl methacrylate but also a metyl methacrylate-based copolymer of methyl methacrylate and another vinyl-based monomer.

The glass-transition temperature of the alkyl (meth)acrylate-based resin is preferably 80° C. or more, and more preferably 85° C. or more. In addition, the heat deformation resistant temperature of the alkyl (meth)acrylate-based resin under a pressure of 1.82 MPa is 90° C. or more, preferably 95° C. or more, and more preferably 100° C.

Moreover, the difference in refractive index between the alkyl (meth)acrylate-based resin and the polylactic acid-based resin to be alloyed is preferably 0.05 or less. If the difference in refractive index between the alkyl (meth)acrylate-based resin and the polylactic acid-based resin is larger than 0.05, the transparency of the resin alloyed with these ingredients is impaired, which leads to a decrease in functionality of the optical disc using this resin.

A thickness d of the substrate 12 with a refractive index n meets $(1.58/n) \times 1.2$.

The reflective film 14 is formed on the signal recording surface 20 of the substrate 12. The reflective film 14 is formed by either a plant-derived material or a material existing in nature such as underground mineral substances. For example, a single-layer film or a multi-layer film of aluminum, gold and silver is employed. The multi-layer film is a lamination of a thin film of iron, a thin film of silicon dioxide and a thin film of silicon, for example.

The base printing layer 16 is formed directly on the reflective film 14 and covers at least a portion (area) in which a signal is recorded on the signal recording surface 20. The label print layer 18 is formed on the under printlayer 16. Both the base printing layer 16 and the label print layer 18 use, either a plant-derived material such as biodegradable resin, soy oil and starch or a material existing in nature.

In producing the optical disc 10, the substrate 12 is formed through injection molding of resin in which alkyl (meth) acrylate-based resin is mixed into a polylactic acid-based resin composition, with the use of a substrate die. By providing the substrate die with a pattern corresponding to the pits 22, the pits 22 are transferred to one side of the substrate 12 to form the signal recording surface 20. Then, the reflective film 14 is attached to the signal recording surface 20 through vacuum deposition or sputtering, and the base printing layer 16 and the label print layer 18 are further formed thereon through silk-screen printing.

In forming the substrate 12 of the optical disc 10, if the polylactic acid-based resin of the polylactic acid-based resin composition contains lactide with a low melting point, the lactide sticks to the surface of the substrate die, resulting in a decrease in the transfer rate of the pits 22. In addition, the lactide on the side of the substrate die will be transferred to the surface of the formed substrate 12, thereby causing the surface of the substrate 12 to be clouded. Therefore, as shown in Table 1, the error rate of the optical disc 10 grows with an increase in the content of lactide in the polylactic acid-based resin. In particular, when the content of lactide exceeds 1,000 ppm, the increase of the error rate is accelerated. Accordingly, by keeping the content of lactide in the polylactic acid-based resin down 1,000 ppm, it is possible to maintain high levels of transferability and transparency of the substrate 12.

TABLE 1

| Content of lactide | ppm | 2,300 | 1,700 | 900 | 680 | 480 | 140 |
|---|---|---|---|---|---|---|---|
| Error rate (ave.) | error(s)/sec | 392 | 229 | 164 | 146 | 152 | 137 |

If the weight-average molecular weight of the polylactic acid-based resin is made smaller than 80 thousands, the impact-resistant strength of the optical disc 10 becomes low as shown in Table 2, causing a problem in using the optical disc 10. In this test, the weight-average molecular weight of polylactic acid-based resin was measured by means of a GPC (gel permeation chromatography), and the impact-resistant strength of the optical disc 10 was measured with the use of Izod impact strength according to ASTM D256. On the other hand, if the weight-average molecular weight is made larger than 500 thousands, the polylactic acid-based resin increases in viscosity and thus it is not possible to mold the thin substrate 12 at a high speed. On this account, by setting the weight-average molecular weight of the polylactic acid-based resin at 80 to 500 thousands, it is possible to ensure the durability of the thin optical disc 10 with high level of mass-producibility.

TABLE 2

| Weight-average molecular weight | ten thousand | 7.2 | 8.0 | 10.0 | 10.5 | 12.0 | 15.0 | 17.0 |
|---|---|---|---|---|---|---|---|---|
| Izod impact strength | J/m | 1.7 | 2.0 | 2.8 | 2.8 | 2.8 | 2.8 | 2.8 |

If the amount of a mold release agent added to the polylactic acid-based resin composition is less than 0.16 phr and, in particular, 0.10 phr or less, as shown in Table 3, the polylactic acid-based resin adheres closely to the substrate die, which does not allow the continuous molding of the substrate 12. Additionally, as shown in Table 4, if no mold release agent is added (0 phr), the polylactic acid-based resin adheres closely to the substrate die, and the pits of the substrate 12 will lose shape when the substrate 12 is removed from the substrate die, causing the error rate of the optical disc 10 to be larger than 220 errors/sec, a value defined in the CD specifications. On the other hand, if the amount of addition is larger than 0.32 phr, the transparency of the substrate 12 drops, and the error rate of the optical disc 10 increases and exceeds the CD specification value. Consequently, the mass-reproducibility of the optical disc 10 and the high-level transferability and transparency of the optical disc 10 are assured by setting the amount of a mold release agent added to the polylactic acid-based resin at 0.16 to 0.32 phr.

TABLE 3

| Amount of added mold release agent | phr | 0 | 0.10 | 0.16 | 0.24 | 0.32 | 0.40 |
|---|---|---|---|---|---|---|---|
| Continuous molding | | — | unavailable | unavailable | available | available | available | available |

TABLE 4

| Amount of added mold release agent | phr | 0 | 0.16 | 0.24 | 0.32 | 0.40 |
|---|---|---|---|---|---|---|
| Error rate (ave.) | error(s)/sec | 1,000 | 198 | 161 | 209 | 245 |

Figure 2:
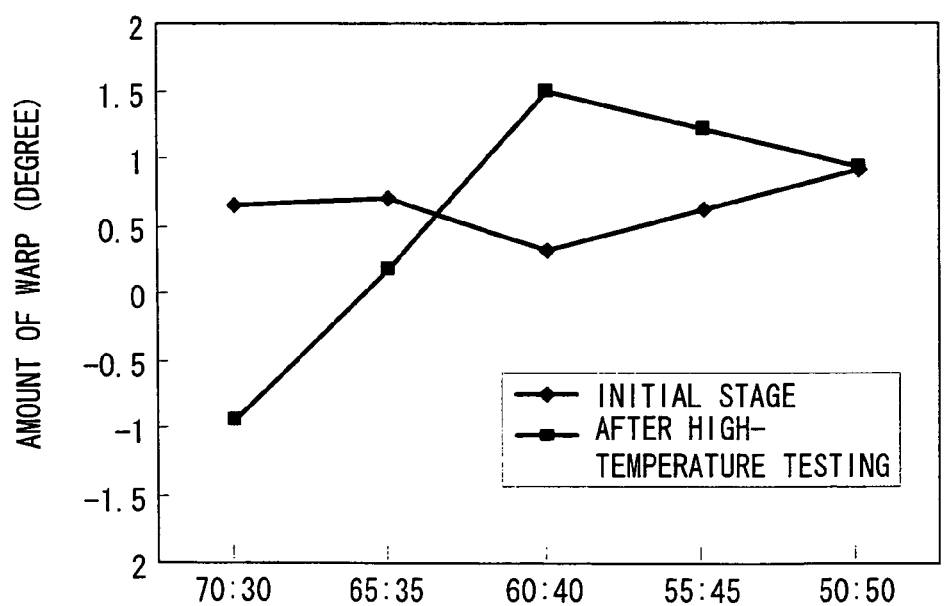
FIG. 2 is a graph showing the relationship between the amount of a warp in the optical disc and the weight ratio of polylactic acid-based resin to polymethyl methacrylate.

By mixing polymethyl methacrylate of high compatibility with the polylactic acid-based resin and being nearly equal in refractive index with the polylactic acid-based resin into the polylactic acid-based resin, it is possible to enhance the heat resistant properties of the substrate 12 without impairing the moldability and transparency of the substrate 12. More specifically, if the substrate 12 is formed with a weight ratio between the polylactic acid-based resin and the polymethyl methacrylate of 70:30 to 50:50, the glass-transition temperature of the substrate 12 becomes 60° C. or more as shown in Table 5, and thus the deformation of the optical disc 10 under a 60-° C. atmosphere is suppressed. In addition, as shown in FIG. 2, the amount of a warp in the optical disc 10 is small in this range of weight ratios. In this test, the substrate 12 was formed with a changed weight ratio between the polylactic acid-based resin and the polymethyl methacrylate, and the optical disc 10 using this substrate 12 was put into a high-temperature oven at a temperature of 60° C. and a humidity of 40%. Then, the optical disc 10 was taken out of the high-temperature oven after a lapse of two hours, and the amount of a warp in the optical disc 10 was measured.

TABLE 5

| Weight of polylactic acid-based resin:weight of polymethyl methacrylate | 100:0 | 85:15 | 70:30 | 65:35 | 60:40 | 55:45 | 50:50 | 46:54 | 42:58 | 0:100 |
|---|---|---|---|---|---|---|---|---|---|---|
| Glass-transition temperature °C. | 55 | 57.2 | 59.6 | 60.7 | 64.2 | 68.6 | 69.2 | 72.3 | 74.4 | 106.7 |

Moreover, if the weight ratio between the polylactic acid-based resin and the polymethyl methacrylate is set at 50:50, the proportion of plant-derived resin in the substrate 12 becomes 50%. Therefore, by setting the weight ratio between the polylactic acid-based resin and the polymethyl methacrylate at 70:30 to 50:50, it is possible to enhance the heat resistance of the optical disc 10 while maintaining the superiority of plant-derived resin in the optical disc 10.

As stated above, by using the polylactic acid-based resin composition in which a mold release agent of 0.16 to 0.32 phr is added to the polylactic acid-based resin, the substrate 12 formed through injection molding becomes easy to remove from the die. This allows the high-speed molding of the substrate 12 while maintaining the transferability and transparency of the substrate 12.

By keeping the content of lactide in the polylactic acid-based resin below 1,000 ppm, it is possible to improve the transparency and transferability of the substrate 12.

In addition, by mixing polymethyl methacrylate into the polylactic acid-based resin composition and setting the weight ratio between the polylactic acid-based resin and the alkyl (meth)acrylate-based resin at 70:30 to 50:50, it is possible to enhance the heat resistant properties of the substrate 12 while maintaining the transparency of the substrate 12 and the superiority of plant-derived resin therein.

Figure 3:
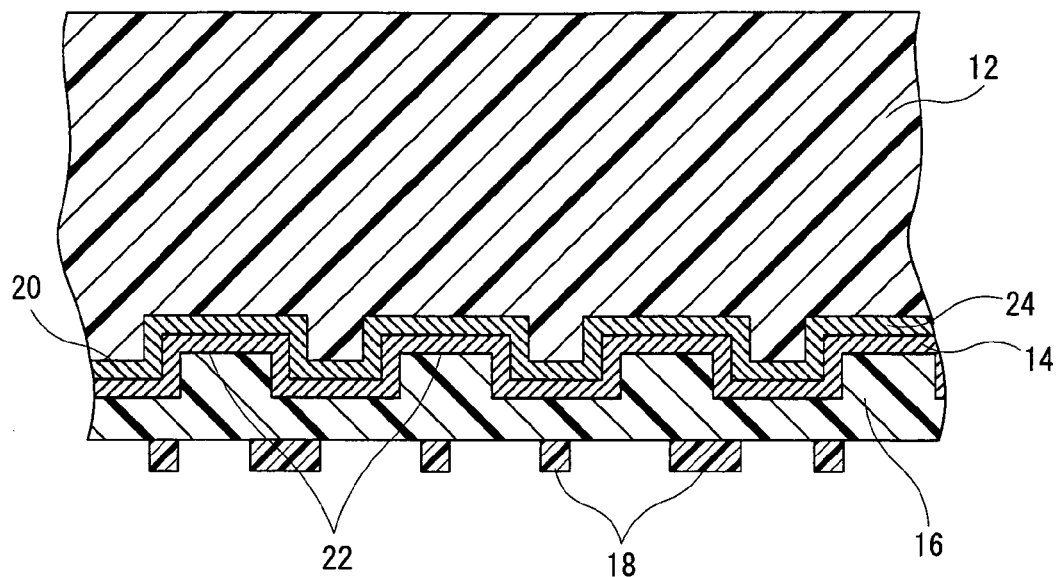
FIG. 3 is a cross section view showing an optical disc of another embodiment of the present invention.

Besides, a recording film 24 shown in FIG. 3 may be provided between the substrate 12 and the reflective film 14. The optical disc 10 is formed by laminating the substrate 12, the recording film 24, the reflective film 14, the base printing layer 16 and the label print layer 18 in this order. The optical disc 10 is rewritable with the recording film 24, and some examples are CD-R, CD-RW, DVD-R and DVD-RW.

Figure 4:
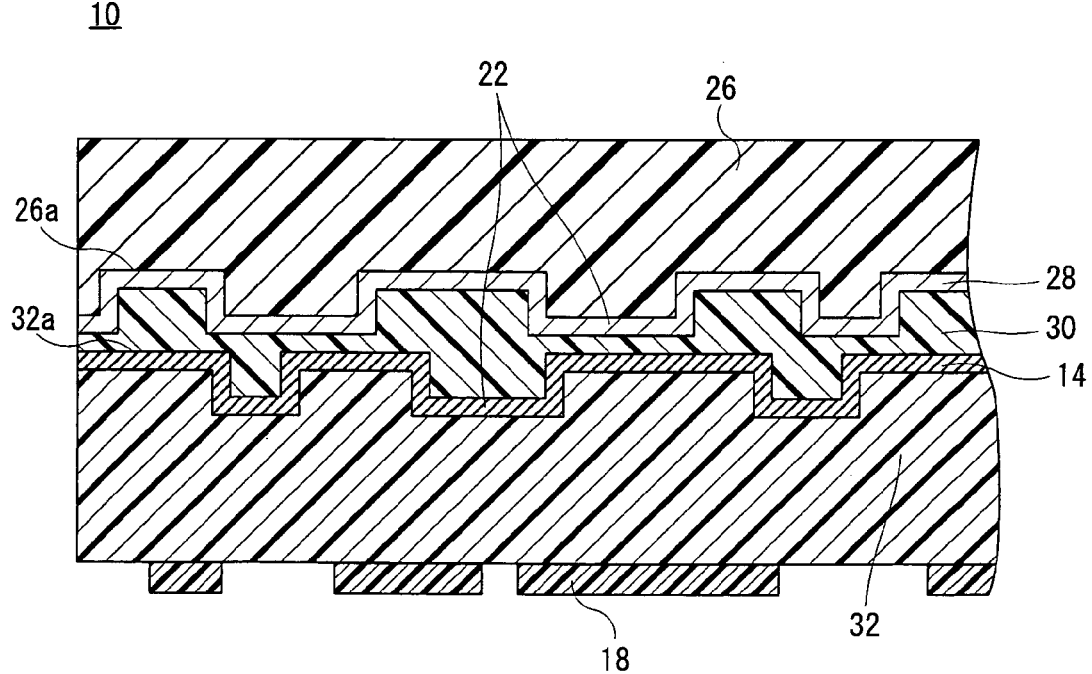
FIG. 4 is a cross section view showing an optical disc of still another embodiment of the present invention.

The optical disc of another embodiment of the present invention shown in FIG. 4 is a DVD with one side of two layers, for example, and comprises a first substrate 26, semipermeable reflective film 28, an adhesive layer 30, a reflective film 14, a second substrate 32 and a label print layer 18. In addition, the components corresponding to those of the optical disc of FIG. 1 are given the same numbers as those of the FIG. 1 optical disc, and thus descriptions of them are omitted here.

The first substrate 26 is a circular plate with pits 22, etc. formed on one side as a first signal recording surface 26a, and is formed by a transparent polylactic acid-based resin composition in which a mold release agent is added to polylactic acid-based resin. This polylactic acid-based resin composition is the same as the polylactic acid-based resin composition used in the substrate 12 of the FIG. 1 embodiment.

The second substrate 32 is a circular plate with the pits 22, etc. formed on one side as a second signal recording surface 32a, and is formed by transparent resin in which a polylactic acid-based resin composition and alkyl (meta) acryl-based resin are alloyed. This transparent resin is the same as the transparent resin used in the substrate 12 of the FIG. 1 embodiment.

The semipermeable film 28 is a film that reflects first wavelength laser light and allows the passage of second wavelength laser light, and is formed from gold- and silicon-based materials, for example. The first wavelength laser light is laser light that reproduces a signal (pits 22) recorded on the first signal recording surface 26a of the first substrate 26, and the second wavelength laser light is laser light that reproduces a signal recorded on the second signal recording surface 32a of the second substrate 32.

There is no limit to the kind of the adhesive layer 30, provided that it is of transparency. The adhesive layer 30 may have a material derived from plants, material existing in nature, ultraviolet cure acryl-based resin, etc.

In producing the optical disc 10, the first substrate 26 with the pits 22 transferred to one side is formed by a polylactic acid-based resin composition through injection molding, and the semipermeable reflective film 28 is attached to the first signal recording surface 26a of the first substrate 26 through sputtering, etc. Besides this, by using transparent resin in which the polylactic acid-based resin composition and the alkyl (meth)acrylate-based resin are alloyed, the second substrate 32 with the pits 22 transferred to one side is formed through injection molding, and the reflective film 14 is formed on the second signal recording surface 32a of the second substrate 32. Then, the first substrate 26 and the second substrate 32 are bonded to each other by the adhesive layer 30 in such a manner that the first signal recording surface 26a and the second signal recording surface 32a are faced to each other. Finally, the label print layer 18 is formed on the second substrate 32 through silk-screen printing.

As stated above, by forming the first substrate 26 in contact with the outside world by the polylactic acid-based resin composition and forming the second substrate 32 by the transparent resin in which the polylactic acid-based resin composition and the alkyl (meta) acryl-based resin are alloyed, the superiority and heat resistance of plant-derived resin in the optical disc 10 are enhanced.

The first substrate here 26 employs the polylactic acid-based resin composition, and alternatively, may use transparent resin in which the polylactic acid-based resin composition and the alkyl (meth)acrylate-based resin are alloyed. This allows the first substrate 26 and the second substrate 32 to be formed from the polylactic acid-based resin composition and the alkyl (meth)acrylate-based resin, making it possible to further increase the heat resistance of the optical disc 10.

In addition, it is possible to make the first substrate 26 using transparent resin in which polylactic acid-based resin composition and alkyl (meth)acrylate-based resin are alloyed, and make the second substrate 32 using plant-derived resin other than the transparent resin. In this case, the second substrate 32 may use opaque resin because it is not required to have a light transmitting property.

Figure 5:
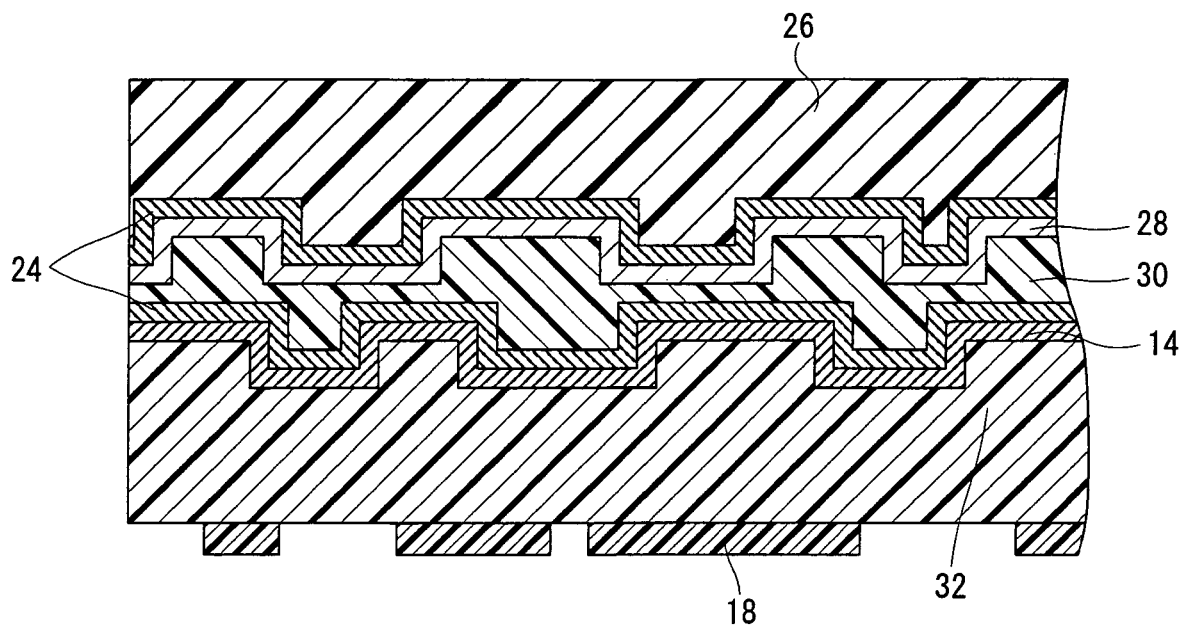
FIG. 5 is a cross section view showing an optical disc of further another embodiment of the present invention.

Moreover, a recording film 24 shown in FIG. 5 may be provided between the first substrate 26 and the semipermeable reflective film 28, and between the adhesive layer 30 and the reflective film 14. The optical disc 10 comprises the first substrate 26, the recording film 24, the semipermeable reflective film 28, the adhesive layer 30, the recording film 24, the reflective layer 14, the second substrate 32 and the label print layer 18. By providing the recording film 24, the optical disc 10 becomes rewritable.

Figure 6:
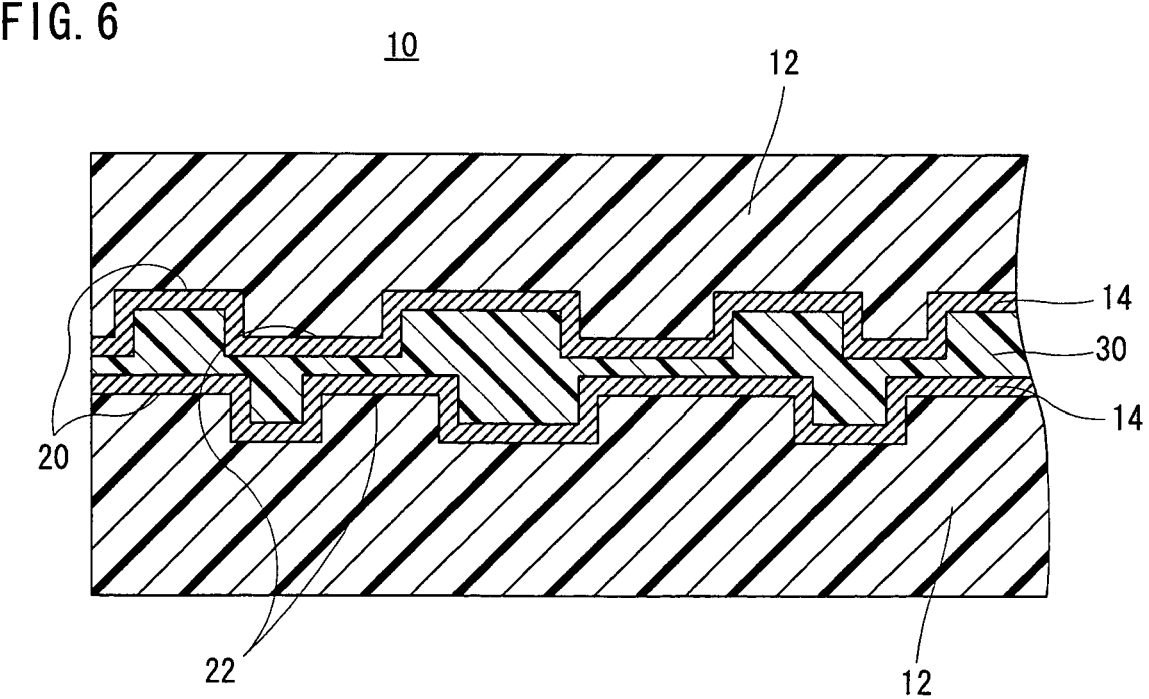
FIG. 6 is a cross section view showing an optical disc of another embodiment of the present invention.

An optical disc of another embodiment of the present invention shown in FIG. 6 is a DVD with the both sides of single layer, for example, and comprises a substrate 12, a reflective layer 14, an adhesive layer 30, a reflective layer 14 and a substrate 12. The components corresponding to those of the optical disc of FIG. 1 are given the same numbers as those of the FIG. 1 optical disc, and thus descriptions of them are omitted here.

In producing this optical disc 10, the substrate 12 with pits 22 transferred to one side is formed through injection molding of transparent resin in which a polylactic acid-based resin composition and alkyl (meta) acryl-based resin are alloyed, and the reflective film 14 is attached to a signal recording surface 20 of the substrate 12 through sputtering, etc. Two substrates 12 formed as stated above are prepared and bonded to each other by the adhesive layer 30 in such a manner that their signal recording surfaces 20 are faced to each other.

Figure 7:
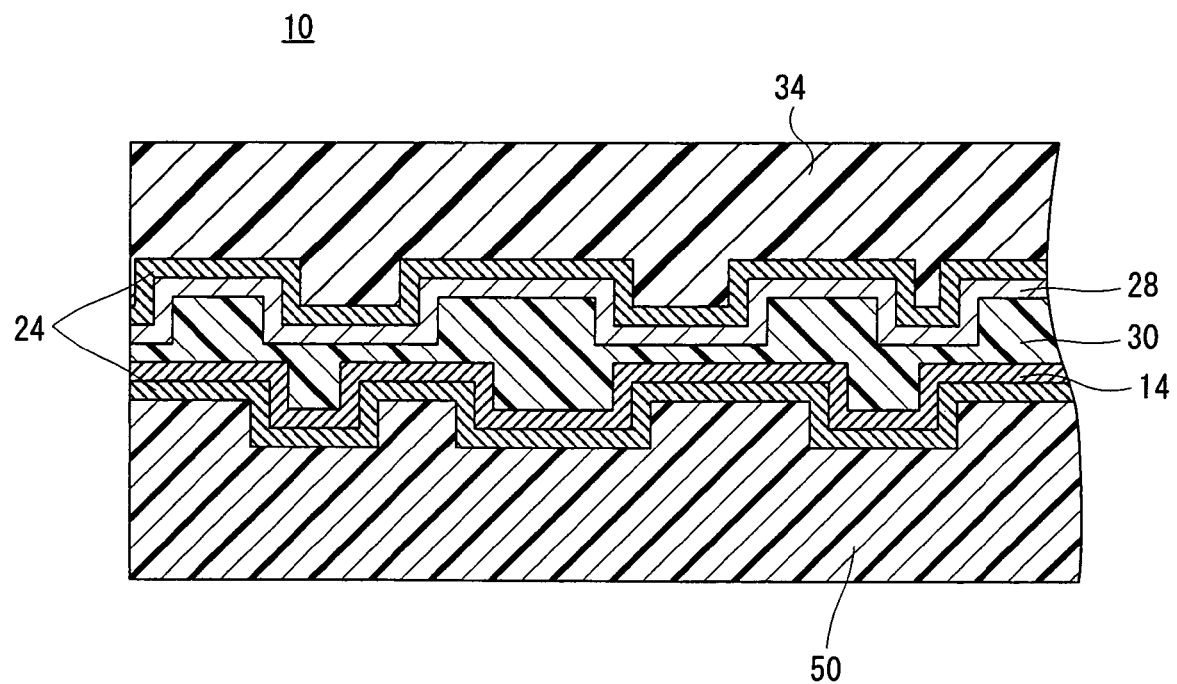
FIG. 7 is a cross section view showing an optical disc of still another embodiment of the present invention.

Furthermore, a recording film 24 shown in FIG. 7 may be provided between the substrate 12 and the reflective film 14. The optical disc 10 is formed by laminating the substrate 12, the recording film 24, the reflective film 14, the adhesive layer 30, the reflective film 14, the recording film 24 and the substrate 12 in this order.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc comprising:
   a substrate with a signal recording surface formed on one side and made of polylactic acid-based resin composition having polylactic acid-based resin with a mold release agent added,
   wherein the content of lactide in said polylactic acid-based resin is 1,000 ppm or less and the amount of said added mold release agent is 0.16 to 0.32 phr, and
   wherein a thickness of the substrate with a refractive index n meets $(1.58/n) \times 1.2$.

2. An optical disc according to claim 1, wherein alkyl (meth)acrylate-based resin is further mixed into said polylactic acid-based resin composition in said substrate.

3. An optical disc according to claim 2, wherein the weight ratio of said polylactic acid-based resin to said alkyl (meth)acrylate-based resin is 70:30 to 50:50.

4. An optical disc comprising:
   a substrate with a signal recording surface formed on one side and made of transparent resin having an alloy of polylactic acid-based resin and alkyl (meth)acrylate-based resin,
   wherein the weight ratio of said polylactic acid-based resin to said alkyl (meth)acrylate-based resin is 70:30 to 50:50, and
   wherein the difference in refractive index between the alkyl (meth)acrylate-based resin and the polylactic acid-based resin to be alloyed is 0.05 or less.

5. An optical disc according to claim 4, wherein the weight ratio of said polylactic acid-based resin to said alkyl (meth) acrylate-based resin is 55:45.

6. An optical disc according to claim 4 or 5, further comprising:
   a reflective film formed on said signal recording surface of said substrate by either a plant-derived material or a material existing in nature;
   a base printing layer formed so as to cover said reflective film by either a plant-derived material or a material existing in nature; and
   a label print layer formed on said base printing layer by either a plant-derived material or a material existing in nature.

7. An optical disc comprising:
   two substrates with a signal recording surface formed on one side and made of transparent plant-derived resin, said two substrates having said signal recording surfaces opposed to each other, at least one of said two substrates being formed by transparent resin in which polylactic acid-based resin and alkyl (meth)acrylate-based resin are alloyed; and reflective films formed on said signal recording surfaces of said two substrates by either a plant-derived material or a material existing in nature, wherein a thickness of the substrate with a refractive index n meets $(1.58/n) \times 1.2$.

8. An optical disc according to claim 7, wherein a recording film is formed between said substrate and said reflective film.

9. An optical disc according to claim 7 or 8, wherein the weight ratio of said polylactic acid-based resin to said alkyl (meth)acrylate-based resin is 55:45.

10. An optical disc comprising:
    a first substrate with a signal recording surface formed on one side and made of transparent plant-derived resin;
    a semipermeable reflective film formed on said signal recording surface of said first substrate by either a plant-derived material or a material existing in nature;
    an adhesive layer formed by transparent resin on said semipermeable reflective film;
    a second substrate with a signal recording surface formed on one side and made of plant-derived resin on said adhesive layer; and
    a reflective film formed on said signal recording surface of said second substrate by either a plant-derived material or a material existing in nature,
    wherein at least one of said first substrate and said second substrate is formed by transparent resin in which polylactic acid-based resin and alkyl (meth)acrylate-based resin are alloyed, and
    wherein the difference in refractive index between the alkyl (meth)acrylate-based resin and the polylactic acid-based resin to be alloyed is 0.05 or less.

11. An optical disc according to claim 10, wherein said first substrate is formed by polylactic acid-based resin and said second substrate is formed by transparent resin in which polylactic acid-based resin and alkyl (meth)acrylate-based resin are alloyed.

12. An optical disc according to claim 11, wherein the weight ratio of said polylactic acid-based resin to said alkyl (meth)acrylate-based resin is 55:45.

13. An optical disc according to any one of claim 10 or 12, wherein a recording film is formed between said first substrate and said semipermeable reflective film, and between said adhesive layer and said reflective film.

14. A material for a substrate of an optical disc with a signal recording surface formed on one side, the material being made of a polylactic acid-based resin composition in which a mold release agent is added to polylactic acid-based resin, wherein the content of lactide in said polylactic acid-based resin is set at 1,000 ppm or less and the amount of said added mold release agent is set at 0.16 to 0.32 phr, and wherein a thickness of the substrate with a refractive index n meets $(1.58/n) \times 1.2$.

15. A material for a substrate of an optical disc according to claim 14, wherein alkyl (meth)acrylate-based resin is further mixed into said polylactic acid-based resin composition.

16. A material for a substrate of an optical disc according to claim 15, wherein the weight ration of said polylactic acid-based resin to said alkyl (meta) acryl-based resin is set at 70:30 to 50:50.

* * * * *